United States Patent
Tran et al.

(10) Patent No.: US 7,044,650 B1
(45) Date of Patent: May 16, 2006

(54) ONE-PIECE FIBER OPTIC RECEPTACLE HAVING CHAMFER AND ALIGNMENT RIBS

(75) Inventors: Hieu V. Tran, Charlotte, NC (US); Xin Liu, Hickory, NC (US); James P. Luther, Hickory, NC (US); Thomas Theuerkorn, Hickory, NC (US); Charles A. Yow, Jr., Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 43 days.

(21) Appl. No.: 10/971,884

(22) Filed: Oct. 22, 2004

(51) Int. Cl.
*G02B 6/36* (2006.01)

(52) U.S. Cl. .............................. 385/76; 385/77; 385/54; 385/56; 385/83

(58) Field of Classification Search .................. 385/56, 385/58, 60, 62, 76
See application file for complete search history.

(56) References Cited

U.S. PATENT DOCUMENTS

| | | | |
|---|---|---|---|
| 4,793,683 A * | 12/1988 | Cannon et al. ................ | 385/60 |
| 6,206,579 B1 | 3/2001 | Selfridge et al. ............. | 385/60 |
| 6,234,683 B1 | 5/2001 | Waldron et al. ............... | 385/78 |
| 6,264,374 B1 | 7/2001 | Selfridge et al. ............. | 385/78 |
| 6,273,618 B1 * | 8/2001 | Cheng .......................... | 385/56 |
| 6,298,190 B1 | 10/2001 | Waldron et al. ............. | 385/134 |
| 6,443,626 B1 * | 9/2002 | Foster .......................... | 385/56 |
| 6,456,774 B1 * | 9/2002 | Lin .............................. | 385/140 |
| 6,579,014 B1 | 6/2003 | Melton et al. ................ | 385/76 |
| 6,648,520 B1 | 11/2003 | McDonald et al. ........... | 385/78 |
| 6,827,597 B1 * | 12/2004 | Metzbower et al. ......... | 439/320 |
| 2002/0097964 A1 * | 7/2002 | Roehrs et al. ................ | 385/59 |
| 2003/0007739 A1 * | 1/2003 | Perry et al. ................... | 385/60 |
| 2003/0063866 A1 * | 4/2003 | Melton et al. ................ | 385/76 |

* cited by examiner

*Primary Examiner*—John D. Leo
*Assistant Examiner*—Rhonda S. Peace
(74) *Attorney, Agent, or Firm*—Christopher C. Dremann; Jeffrey S. Bernard

(57) ABSTRACT

A one-piece fiber optic receptacle is provided for aligning and optically connecting a plug ferrule with a back-side ferrule of like configuration. The fiber optic receptacle includes a receptacle housing defining an internal cavity opening through an external end and an opposed internal end, an alignment sleeve disposed within the internal cavity and received within the internal end of the receptacle housing, and a sleeve retainer secured to the internal end of the receptacle housing and operable for providing access to the alignment sleeve from the internal end of the receptacle housing. The alignment sleeve includes a chamfer for guiding the back-side ferrule into the alignment sleeve. The sleeve retainer has an opening and a plurality of alignment ribs disposed about the opening for permitting angular rotation of the alignment sleeve relative to the sleeve retainer during insertion of the plug ferrule and the back-side ferrule into the alignment sleeve.

20 Claims, 8 Drawing Sheets

ONE-PIECE FIBER OPTIC RECEPTACLE HAVING CHAMFER AND ALIGNMENT RIBS

BACKGROUND OF THE INVENTION

1. Field of the Invention

The present invention relates generally to a fiber optic receptacle for interconnecting optical fibers within a communications network, and more specifically, to a fiber optic receptacle that provides improvements in freeze/thaw cycle performance, sealing and connector alignment.

2. Description of the Related Art

Fiber optic networks are currently revolutionizing the telecommunications industry due to their high bandwidth carrying capacity, low signal degradation and low power usage. As a result, fiber optic networks are being created and expanded to deliver "fiber-to-the-curb" (FTTC), "fiber-to-the-business" (FTTB), "fiber-to-the-home" (FTTH), "fiber-to-the-premises" (FTTP) and "fiber-to-the-subscriber" (FTTS), referred to generically as "FTTx." In order to provide services to one of these subscriber locations, fiber optic networks must include a large number of interconnection points in which optical fibers are optically connected or mated in the field. In the most recently developed fiber optic networks, communications service providers are demanding factory-prepared interconnection solutions, commonly referred to as "plug-and-play" systems, that are robust enough for use in field applications. Plug-and-play systems allow less skilled field technicians to readily perform optical interconnections, thereby reducing field labor costs and the time required to install and activate optical networks.

Factory-prepared interconnection solutions should not only properly align mating optical fibers, but should also protect the mating optical fibers against adverse environmental and mechanical influences, such as from moisture intrusion and tensile forces, and more particularly, protect the receptacle assembly (i.e., alignment sleeve, etc.) at which the optical fibers are interconnected. Conventional fiber optic receptacles include a receptacle housing defining an internal cavity that houses an alignment sleeve for aligning opposing optical connectors or opposing ferrules. The alignment sleeve is typically inserted from the front-side of the receptacle and is designed to receive a pair of ferrules, each of which is mounted upon the end portions of one or more optical fibers. The alignment sleeve assists in gross alignment of the ferrules, and ferrule guide pins or other alignment means assist in detailed alignment of the optical fibers positioned on the end faces of the opposing ferrules. One of the ferrules is attached to the ends of one or more optical fibers extending from a cable, ribbon or optical fiber device and routed to the back-side of the receptacle, such as from the interior of a conventional optical connection terminal or closure. The other ferrule is mounted one or more optical fibers terminating in a fiber optic plug that is routed to the front-side of the receptacle, for example a connectorized drop cable leading to a subscriber of the optical network.

In the process of mating the opposing ferules within the receptacle, the plug ferrule is inserted into one end of the alignment sleeve. Original receptacle designs required that the plug ferrule be retained within the alignment sleeve by mechanical coupling, such as by means of a pair of latches. While the latches effectively secure the plug ferrule within the alignment sleeve, mechanical coupling disadvantageously limits float between the plug ferrule and the alignment sleeve. Recent receptacle designs include a biasing member, for example one or more linear springs, for providing float. In testing these receptacle designs, it has been determined that the biasing springs are subject to deformation during loading and ferrule insertion. To prevent this, structural design changes are needed to control spring travel and thereby prevent buckling. A new design is also needed to facilitate assembly by allowing for a "loose" fit between the biasing springs and the guide structures, and between the biasing springs and the bores into which the biasing springs are inserted. A receptacle design that controls spring travel, prevents buckling and provides for a loose fit would prevent damage to the biasing springs during assembly and use.

A possible advantage associated with existing receptacle designs is that they allow access to the alignment sleeve and the back-side (i.e., internal) ferrule from the outside of the connection terminal or enclosure without entering the connection terminal or closure, referred to herein as "external access." To accomplish this, the receptacle is designed in two pieces as viewed from the front-side (i.e., external) side of the receptacle with the alignment sleeve held within the receptacle housing (first piece) by a second piece that is attached to the first piece and removable from outside the connection terminal or closure. An example of such an external two-piece design is the fiber optic receptacle described and shown in U.S. Pat. No. 6,579,014 entitled Fiber Optic Receptacle, which is assigned to the assignee of the present invention. However, such an external two-piece design requires an extra seal between the first piece and the second piece to prevent water ingress. Furthermore, the seal must be sufficiently strong to prevent connector failure due to freeze/thaw cycling that causes the second piece to separate from the first piece. In addition, an external two-piece design requires strict control and maintenance of high-quality molded surfaces. As previously mentioned, the external two-piece design provides a field technician with access to the alignment sleeve and the back-side ferrule. Accordingly, while it is advantageous to eliminate the external two-piece design and extra seal, an external one-piece design also eliminates the ability to access the alignment sleeve and back-side ferrule from the front-side of the receptacle. However, an external one-piece design permits the receptacle assembly to pass freeze/thaw cycle testing and provides further improvements with respect to ferrule and optical fiber alignment, which is especially important when mating angled physical contact (APC) connectors for low-loss requirements.

BRIEF SUMMARY OF THE INVENTION

To achieve the foregoing and other objects, and in accordance with the purposes of the invention as embodied and broadly described herein, the present invention provides various embodiments of a fiber optic receptacle assembly, and more particularly, a fiber optic receptacle having an improved alignment sleeve retainer and biasing member supports. Thus, the present invention provides a fiber optic receptacle designed to readily align and mate any like pair of opposed optical connectors or ferrules in a precise and secure manner, while providing strain relief against pulling forces of up to about 600 lb/ft.

In one embodiment, the invention provides a fiber optic receptacle including a receptacle housing defining an external end, an internal end and an internal cavity for housing an alignment sleeve operable for interconnecting like optical connectors or ferrules. The receptacle housing permits insertion and removal of the alignment sleeve from the internal end, or back-side, of the housing only, thus eliminating removal of the alignment sleeve from the external end, or front-side, of the receptacle. The alignment sleeve is retained within the internal cavity via a sleeve retainer that is secured to the internal end of the receptacle housing. The alignment sleeve is removed from the internal cavity by completely removing the sleeve retainer.

In another embodiment, the invention provides a fiber optic receptacle including a receptacle housing, a sleeve retainer and an alignment sleeve for receiving and aligning like optical connectors or ferrules. The receptacle housing permits the alignment sleeve to be inserted and removed from the back-side of the receptacle only, as compared to a conventional external two-piece design in which the alignment sleeve is removed from the front-side of the receptacle to permit access to the alignment sleeve and the back-side ferrule. The fiber optic receptacle may be secured within a wall of an enclosure or may be used as a stand-alone receptacle assembly. The alignment sleeve defines a lengthwise, longitudinally extending passageway opening through opposed first and second ends that is adapted to receive a plug ferrule contained or partially contained within a first fiber optic connector and a second end adapted to receive a back-side ferrule contained or partially contained within a second fiber optic connector. The receptacle housing includes opposed external and internal ends, wherein the external end is adapted to receive the plug ferrule and the internal end is adapted to receive the alignment sleeve and the back-side ferrule. A sleeve retainer adjacent the internal end of the receptacle housing floatingly retains the alignment sleeve within an internal cavity of the receptacle. The sleeve retainer and the receptacle housing define tapered biasing member supports for supporting one or more linear biasing springs that operably engage the alignment sleeve so as to urge the alignment sleeve towards the external end of the receptacle housing. The alignment sleeve defines a chamfer on its second end as a means for guiding the back-side ferrule into the alignment sleeve. The sleeve retainer defines a plurality of internal alignment ribs that provide a loose fit for facilitating alignment of the back-side ferrule and the plug ferrule within the alignment sleeve.

Typically, the fiber optic receptacle provides strain relief to an optical connection terminal or closure so that one or more optical fibers of a fiber optic cable may be aligned and optically interconnected with one or more optical fibers routed to the receptacle from within the connection terminal or closure. In one embodiment, the fiber optic receptacle includes a receptacle housing having an internal end and an external end, and an alignment sleeve that is biased towards the external end of the housing. The alignment sleeve is biased so that when a fiber optic plug ferrule is inserted into the external end of the receptacle housing, the end face of the plug ferrule maintains physical contact with the end face of a back-side ferrule positioned within the alignment sleeve without requiring the plug ferrule to be latched to the alignment sleeve, thereby providing float between the respective ferrules. According to a further embodiment, a universal fiber optic receptacle is provided wherein an internal cavity defined by the receptacle housing and the associated sleeve retainer is sized to receive any alignment sleeve or optical connector, such as for example, alignment sleeves configured to receive and align a plurality of types of optical connectors or ferrules including MTP, MTRJ, SC-DC, SC, DC, LC, and the like.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
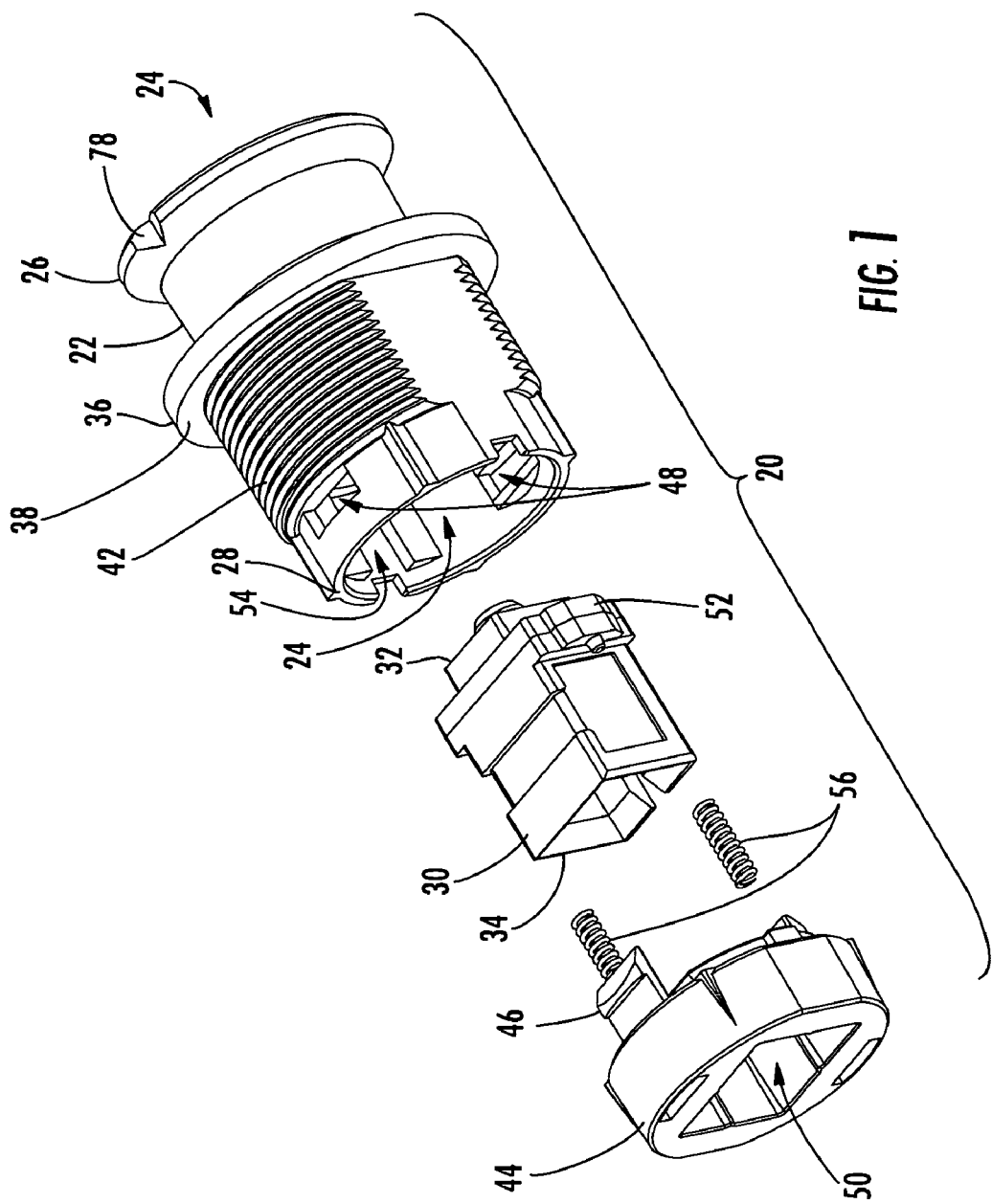
FIG. 1 is an exploded perspective view of a fiber optic receptacle in accordance with an exemplary embodiment of the present invention illustrating the receptacle housing, the sleeve retainer, the alignment sleeve and a pair of biasing members.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The various embodiments described below provide a fiber optic receptacle having an external one-piece design that eliminates the need for an internal seal, while permitting access to an alignment sleeve from only the back-side of the receptacle. The external one-piece design is an improvement over conventional external two-piece designs that permits the receptacle assembly to pass freeze/thaw cycle testing and provides further improvements with respect to ferrule and optical fiber alignment, which is especially important when mating angled physical contact (APC) connectors for low-loss requirements. The fiber optic receptacle of the present invention further provides an improved sleeve retainer, alignment sleeve and biasing member supports. Thus, the present invention provides a fiber optic receptacle designed to readily align and mate any like pair of opposed optical connectors or ferrules in a precise and sealed manner, while providing strain relief against pulling forces of up to about 600 lb/ft.

The fiber optic receptacle interconnects optical fibers within a communications network. The receptacle is designed such that it may be mounted within an optical connection terminal, closure or similar enclosure defining an opening or port in a wall through which one or more optical fibers are routed. The receptacle may also be mounted within an optical connection terminal, closure, pedestal, network interface device or like enclosure. In other embodiments, because of the robust (i.e., rugged) nature of its structure, the receptacle may be used in buried network installations. The fiber optic receptacle may also be used as a generic receptacle assembly and need not be mounted within any wall of any enclosure. If mounted within a wall, however, a rigid shoulder of the receptacle housing and a coupling nut secure the receptacle to the wall, thus providing superior strain relief for tensile forces, up to about 600 lb/ft, as compared to conventional receptacle assemblies.

In the exemplary embodiments shown and described herein, the fiber optic receptacle is adapted to receive a corresponding fiber optic plug having a plug ferrule mounted upon the end of a fiber optic cable comprising one or more optical fibers for optically connecting one or more optical fibers of a corresponding ferrule on the back-side of the receptacle (i.e., back-side ferrule). As used herein, the fiber optic cable associated with the fiber optic plug is referred to as a "drop cable" and is intended to include all types of fiber optic cables such as, but not limited to, a branch cable, a distribution cable, an extended distribution cable, a flat dielectric drop cable, a figure-eight drop cable or an armored drop cable. The drop cable typically comprises between one and about twelve optical fibers, depending on the type of cable and the number and type of optical connectors. The particular components of the fiber optic receptacle and fiber optic plug described herein may be modified to accommodate different cable types and optical connectors. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals.

The fiber optic receptacle of the present invention provides an external one-piece sealed design that prevents moisture and contaminates from reaching the end faces of the plug ferrule and back-side ferrule. In all embodiments in which the receptacle is mounted in an opening or port within a wall, a sealing gasket provides a seal between the internal and external environments defined by the wall. Generally speaking, most of the components of the fiber optic receptacle and fiber optic plug are formed from a suitable polymer. Preferably, the polymer is a UV stabilized polymer such as ULTEM 2210 available from GE Plastics of Pittsfield, Mass. However, other suitable materials made also be used. For example, stainless steel or any other suitable metal may be used for various components of the receptacle and/or plug.

Figure 2:
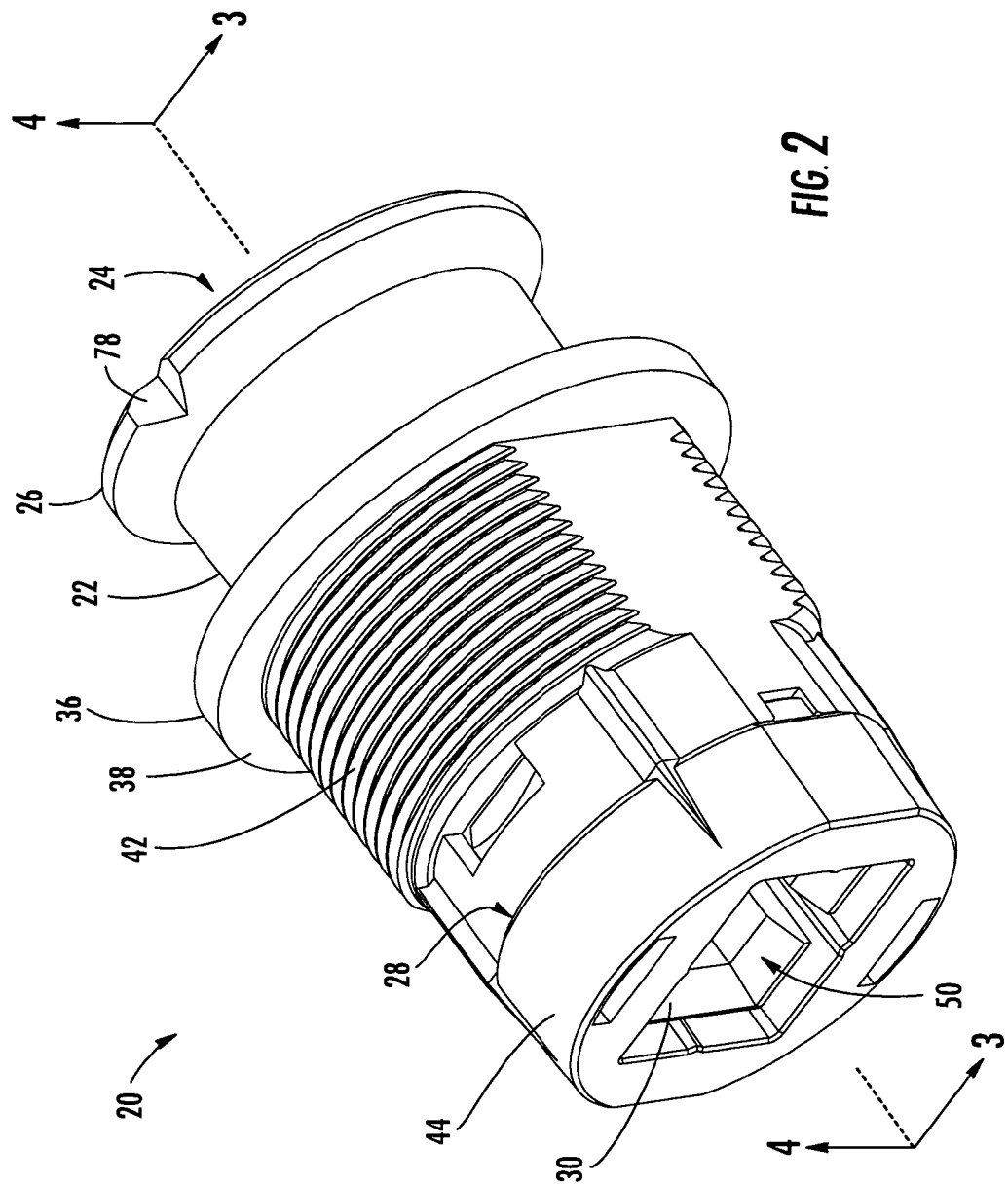
FIG. 2 is a perspective view of the fiber optic receptacle of FIG. 1 shown in an assembled configuration.

Referring now to FIGS. 1 and 2, a fiber optic receptacle 20 in accordance with an exemplary embodiment of the invention is shown. FIG. 1 shows the fiber optic receptacle 20 in an exploded, or disassembled, configuration, while FIG. 2 shows the fiber optic receptacle 20 in an assembled configuration. The receptacle 20 is preferably mounted within an opening or port in a wall of an enclosure (not shown) to connect optical fibers from outside the enclosure with optical fibers from within the enclosure. The fiber optic receptacle 20 may be designed to accommodate and mate with any type of fiber optic plug (see FIGS. 7 and 8) that is mounted upon the end portion of a fiber optic cable (not shown). As shown, the receptacle 20 includes a receptacle housing 22 defining an internal cavity 24 opening through opposed ends, the opposed ends comprising a first, or external, end 26 and a second, or internal, end 28. Typically, the opening through the external end 26 is sized to accommodate a corresponding fiber optic plug (not shown). Conversely, the opening through the internal end 28 is sized to accommodate an alignment sleeve 30 configured to be inserted into and retained within the internal cavity 24. The relatively large opening of the external end 26 allows the alignment sleeve and the end face of a back-side ferrule to be cleaned with a cleaning tool, such as a cotton swab (e.g., Q-tip) or similar device. This is advantageous since the receptacle, in contrast to the fiber optic plug, may be exposed to adverse environmental conditions and possibly accumulate contaminants while not being used for a prolonged period of time. The various embodiments shown and described herein allow for easy cleaning and improved access without disassembly. In addition, the external end 26 of the receptacle 20 may be fitted with a dummy plug or dust cap when not in use to reduce the possibility of accumulating contaminants within the internal cavity 24.

The alignment sleeve 30 defines a lengthwise, longitudinally extending passageway opening through opposed ends, the opposed ends comprising a first end 32 and a second end 34. The alignment sleeve 30 receives and aligns a back-side ferrule (not shown) mounted upon the ends of one or more optical fibers routed to the receptacle 20 from inside the wall of the enclosure with a plug ferrule (not shown) of a fiber optic plug mounted upon the ends of one or more optical fibers of a fiber optic cable. In this regard, the plug ferrule of the fiber optic plug is inserted through the external end 26 of the receptacle 20 into the opening defined by the first end 32 of the alignment sleeve 30, while the back-side ferrule is inserted through the internal end 28 of the receptacle 20 into the opening defined by the second end 34 of the alignment sleeve 30.

The receptacle housing 22 may be sized and shaped in any suitable manner. In the embodiments shown, the receptacle housing 22 comprises a cylindrical portion defining the internal cavity 24 and a flanged portion 36 located medially along the length of the housing 22, preferably nearer to the external end 26. The flanged portion 36 extends radially outward from the receptacle housing 22 and defines a solid, generally flat surface 38 for receiving a sealing member. A generally flat elastomeric gasket (shown in FIGS. 7 and 8 at 39) or conventional O-ring is preferably disposed between the surface 38 and the exterior surface of the wall in order to provide a seal against any adverse environmental conditions. The receptacle housing 22 is secured to the wall using an internally threaded coupling nut (shown in FIG. 7 at 40) that is threaded onto an externally threaded surface 42 provided on the receptacle housing 22. As the coupling nut 40 is tightened, the receptacle housing 22 is pulled towards the exterior surface of the wall, thus compressing the gasket and providing an effective seal.

The fiber optic receptacle 20 further includes a sleeve retainer 44 that is secured to the receptacle housing 22 adjacent the internal end 28 of the housing 22. The sleeve retainer 44 may be secured to the receptacle housing 22 in any suitable manner. In the embodiments shown herein, the sleeve retainer 44 defines a plurality of retaining clips 46 that engage corresponding slots 48 defined by the receptacle housing 22. As such, the sleeve retainer 44 is securely retained within the receptacle housing 22. The sleeve retainer 44 secures the "floating" alignment sleeve 30 within the receptacle housing 20 once the retaining clips 46 of the sleeve retainer 44 engage the slots 48 of the receptacle housing 22. By inserting the alignment sleeve 30 from the internal end 28, or back-side, of the receptacle housing 22 and retaining it in place with the sleeve retainer 44, the alignment sleeve 30 may be removed from only the internal, or back-side, of the receptacle 20. In embodiments in which the receptacle 20 is secured within a wall of an enclosure, the alignment sleeve 30 may only be accessed only from the internal, or back-side, of the receptacle 20. In contrast, conventional receptacles include an external two-piece design that permits the alignment sleeve 30 to be removed from the external, or front-side, of the receptacle 20 (e.g., U.S. Pat. No. 6,579,014). In such a design, a field technician is able to remove the alignment sleeve 30 by removing an external second piece of the receptacle housing 22 to gain access to the alignment sleeve 30 from outside the enclosure without the need to enter the enclosure. As previously stated, however, external two-piece designs also require a seal between the first piece and the second piece of the receptacle housing 22 to prevent water ingress. In the present invention, the external one-piece design eliminates the need for an inner seal. Furthermore, freeze/thaw cycling will not cause the second piece to pull away or separate from the first piece and expose the optical fibers from inside the enclosure and the back-side ferrule to adverse environmental conditions, such as water ingress and dust, dirt and insect intrusion.

As shown in FIGS. 1 and 2, the sleeve retainer 44 engages the receptacle housing 22 so as to retain the alignment sleeve 30 within the receptacle housing 22. The sleeve retainer 44 defines an opening 50 large enough to permit the back-side ferrule (not shown) that is mounted upon the ends of the optical fibers originating from inside the enclosure to pass through the sleeve retainer 44 into the alignment sleeve 30. At the same time, the opening 50 is small enough to not permit the alignment sleeve 30 to be removed without removing the sleeve retainer 44 from the receptacle housing 22. Once assembled, the sleeve retainer 44 must be removed from the receptacle housing 22 in order to access the alignment sleeve 30 or to access the back-side ferrule (not shown), such as for cleaning, replacement or the like. In an alternative embodiment, the sleeve retainer 44 may comprise threads that engage corresponding threads on the receptacle housing 22 to retain, access and remove the alignment sleeve 30 from the receptacle housing 22. Once the alignment sleeve 30 or the back-side ferrule has been cleaned, repaired or replaced, the alignment sleeve 30 is inserted into the internal cavity 24 defined by the receptacle housing 22 and the sleeve retainer 44 is secured to the receptacle housing 22.

The alignment sleeve 30 defines a pair of biasing member supports 52 that extend laterally outward from opposed sides of the alignment sleeve 30. While the supports 52 include spring support features, as described in detail below, the supports 52 are also used for aligning the alignment sleeve 30 within the internal cavity 24 of the receptacle housing 22. The supports 52 extend laterally outward such that they seat within guide channels 54 defined within the internal cavity 24 of the receptacle housing 22. The receptacle housing 22 is preferably sized to define the guide channels 54 extending lengthwise therethrough. Thus, the first end 32 of the alignment sleeve 30 can be positioned within the receptacle housing 22. In addition, the supports 52 provide a "keying" function that prevents the alignment sleeve 30 from being improperly loaded into the receptacle housing 22. The supports 52 further aid in preventing the alignment sleeve 30 from being withdrawn through the opening 50 defined by the sleeve retainer 44.

The fiber optic receptacle 20 further includes at least one biasing member disposed within the receptacle housing 22. In the embodiments shown, the biasing member comprises a pair of linear coil springs 56, preferably having a low spring constant (k), that operably engage the alignment sleeve 30 to urge the alignment sleeve 30 toward the external end 26 of the receptacle housing 22 such that the alignment sleeve 30 is spring-loaded. However, the at least one biasing member may be any component, structure or material that biases the alignment sleeve 30 in the direction of the external end 26 of the receptacle housing 22. The springs 56 are positioned between the supports 52 adjacent the first end 32 of the alignment sleeve 30 and the sleeve retainer 44 and are supported by posts, as shown and described in greater detail below. In addition to the spring-loading of the alignment sleeve 30, the plug ferrule of the fiber optic plug that is inserted into the alignment sleeve 30 through the external end 26 if the receptacle housing 22 is also typically spring-loaded. Thus, the spring-loading of the alignment sleeve 30 and the plug ferrule urges the end face of the plug ferrule against the end face of the backside ferrule within the alignment sleeve 30. In contrast to conventional alignment sleeves, connector sleeves or adapter sleeves for coupling ferrules, the alignment sleeve 30 need not include latches to mechanically engage the plug ferrule since the spring-loading will bias the alignment sleeve 30 into engagement with the plug ferrule within the receptacle housing 22. However, the second end 34 of the alignment sleeve 30 preferably includes a means for engaging the back-side ferrule, such as, for example, a latch mechanism that includes one or more latches. Thus, an advantageous alignment sleeve 30 according to an embodiment of this invention is also provided that may also be utilized in situations that do not involve a fiber optic receptacle 20. In alternative embodiments, the fiber optic receptacle 20 may include other types of biasing members, in addition to or instead of one or more springs 56.

Figure 3:
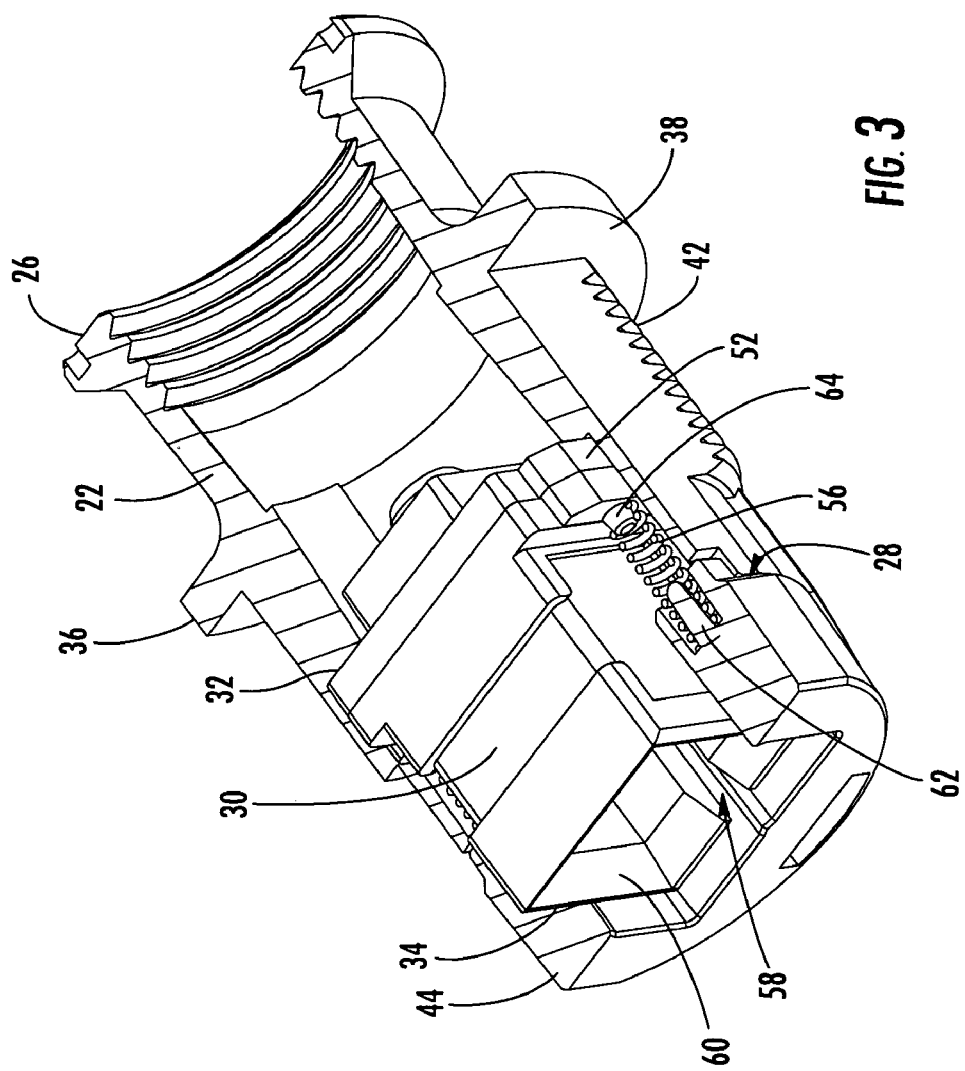
FIG. 3 is a partial cross-sectional view of the assembled fiber optic receptacle of FIG. 2 taken along line 3—3.
Figure 4:
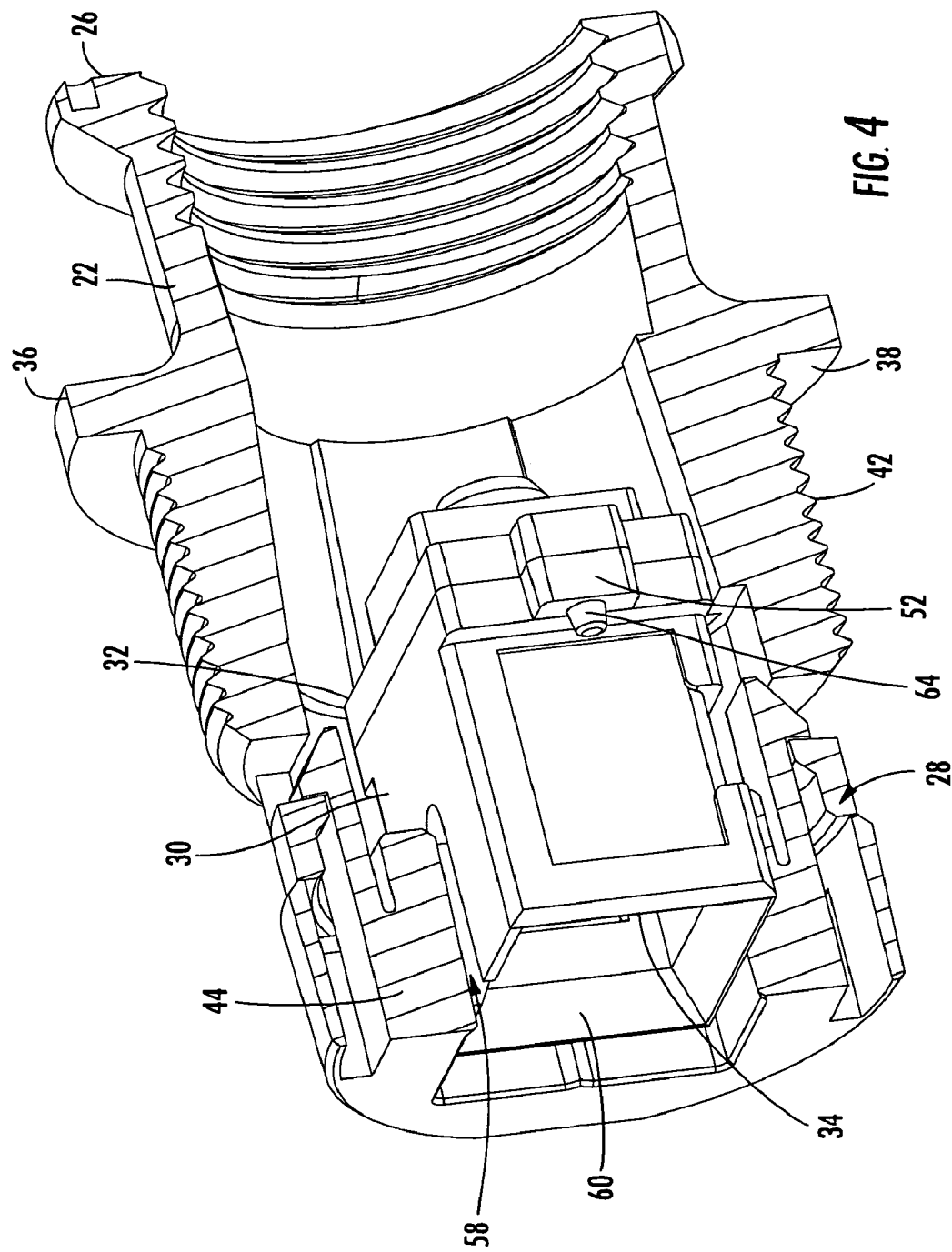
FIG. 4 is a partial cross-sectional view of the assembled fiber optic receptacle of FIG. 2 taken along line 4—4.

Referring now to FIGS. 3 and 4, a cross-sectional view of the assembled fiber optic receptacle of FIG. 2 taken along line 3—3 is shown in FIG. 3, and a cross-sectional view of the assembled fiber optic receptacle of FIG. 2 taken along line 4—4 rotated 90 degrees to line 3—3 is shown in FIG. 4. The external end 26 of the receptacle housing 22 is internally threaded so as to threadably engage an externally threaded fiber optic plug (not shown). As previously described, the alignment sleeve 30 is received through the internal end 28 of the receptacle housing 22 and is retained within the internal cavity 24 by the sleeve retainer 44. The alignment sleeve 30 may be shaped and designed to accommodate and mate with a variety of different types of fiber optic connectors mounted upon the end of a fiber optic cable. As shown, the alignment sleeve 30 defines a lengthwise extending passageway opening through the opposed first end 32 and second end 34 for receiving and aligning the ferrules of the fiber optic connectors. A first fiber optic connector (not shown) including a plug ferrule is inserted into the first end 32 of the alignment sleeve 30. A second fiber optic connector (not shown) including a back-side ferrule that is mounted upon the ends of one or more optical fibers originating from inside the enclosure is inserted through the opening defined by the second end 34 of the alignment sleeve 30. The alignment sleeve 30 preferably defines an alignment slot 58 for receiving a retaining clip (not shown) of the second fiber optic connector. The slot 58 is a keying feature used to align the second fiber optic connector within the alignment sleeve 30 and the retaining clip is used to plug/unplug the second fiber optic connector. The alignment sleeve 30 further defines an interior chamfer 60 for guiding the second fiber optic connector into the alignment sleeve 30. The chamfer 60 helps to protect the end face of the ferrule of the second fiber optic connector by guiding the connector housing during insertion into the alignment sleeve 30.

In the embodiments of the fiber optic receptacle 20 in which the biasing member includes one or more springs 56, the sleeve retainer 44 includes one or more tapered posts 62 extending in a lengthwise direction from the sleeve retainer 44 toward the internal end 28 of the receptacle housing 22.

The tapered posts 62 serve as supporting structures for the springs 56. The sleeve retainer 44 includes the same number of posts 62 as the number of springs 56 such that each spring can be mounted upon a respective post as shown in FIG. 3. In addition, each spring 56 is preferably longer than the respective post 62, even in the spring's compressed state. As such, the posts 62 serve to position the springs 56 that, in turn, bias the alignment sleeve 30 and, more particularly, spring posts 64 of the biasing member supports 52 of the alignment sleeve 30. The spring posts 64 of the supports 52 are aligned with the posts 62 of the sleeve retainer 44. Thus, each spring 56 contacts a respective biasing member support 52 of the alignment sleeve 30 and urges the alignment sleeve 30 toward the external end 26 of the receptacle housing 22. The spring posts 64 of the biasing member supports 52 are preferably tapered, and more preferably, conical in shape. Both sets of posts 62, 64 are preferably tapered in order to capture the springs 56 during assembly, thus facilitating loading and positioning the springs 56 between the alignment sleeve 30 and the sleeve retainer 44. In other words, the tapered shape provides a feeding mechanism for seating springs 56 properly. Because the springs 56 have a low spring constant (k), they are subject to bowing, and even buckling, during assembly. Thus, improper spring 56 seating may result in poor or uneven biasing of the alignment sleeve 30. The tapered shape of the posts 62, 64 provides proper spring 56 seating and eliminates assembly errors.

Figure 5:
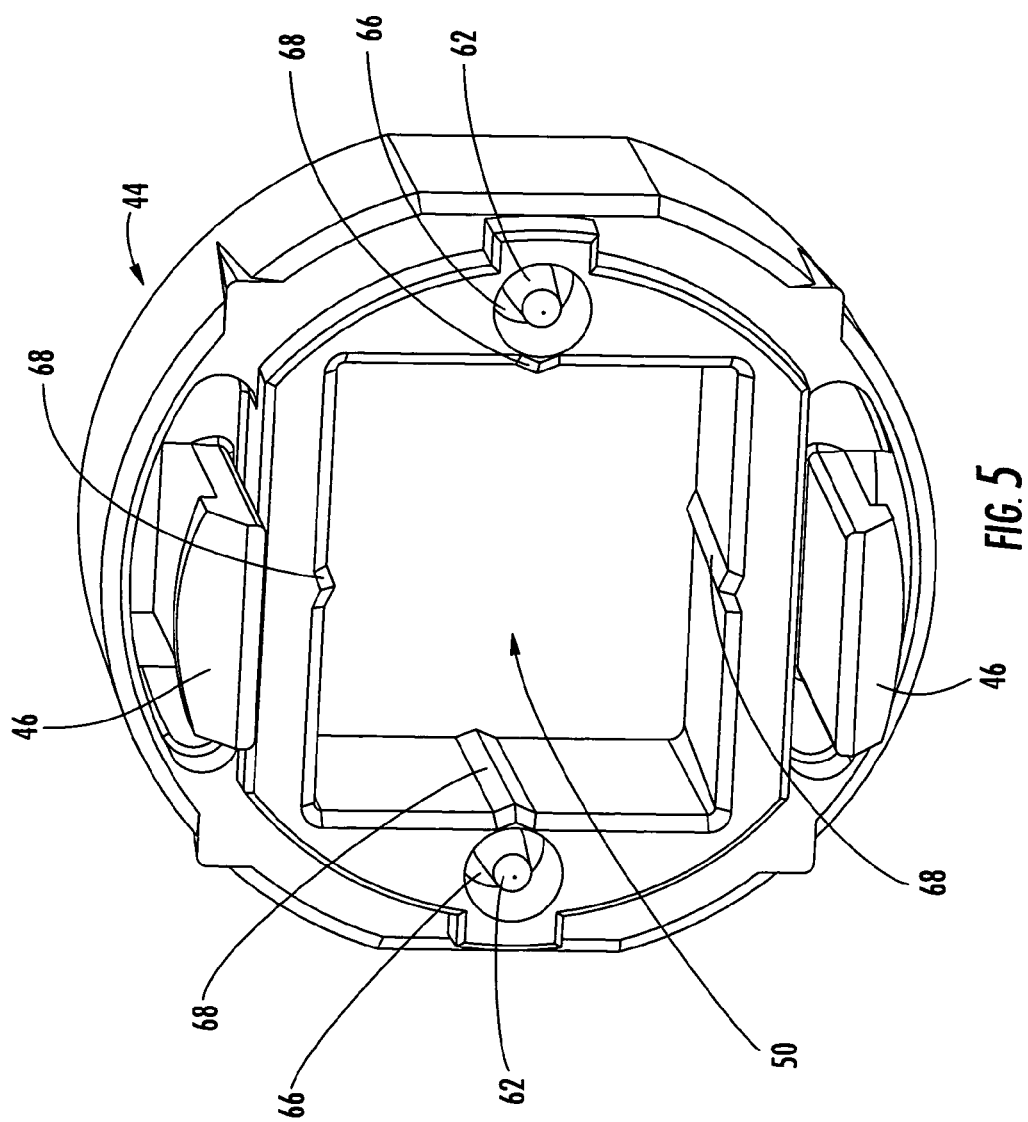
FIG. 5 is a front-side perspective view of the sleeve retainer of the fiber optic receptacle of FIG. 1 illustrating the alignment ribs and the biasing member supports.
Figure 6:
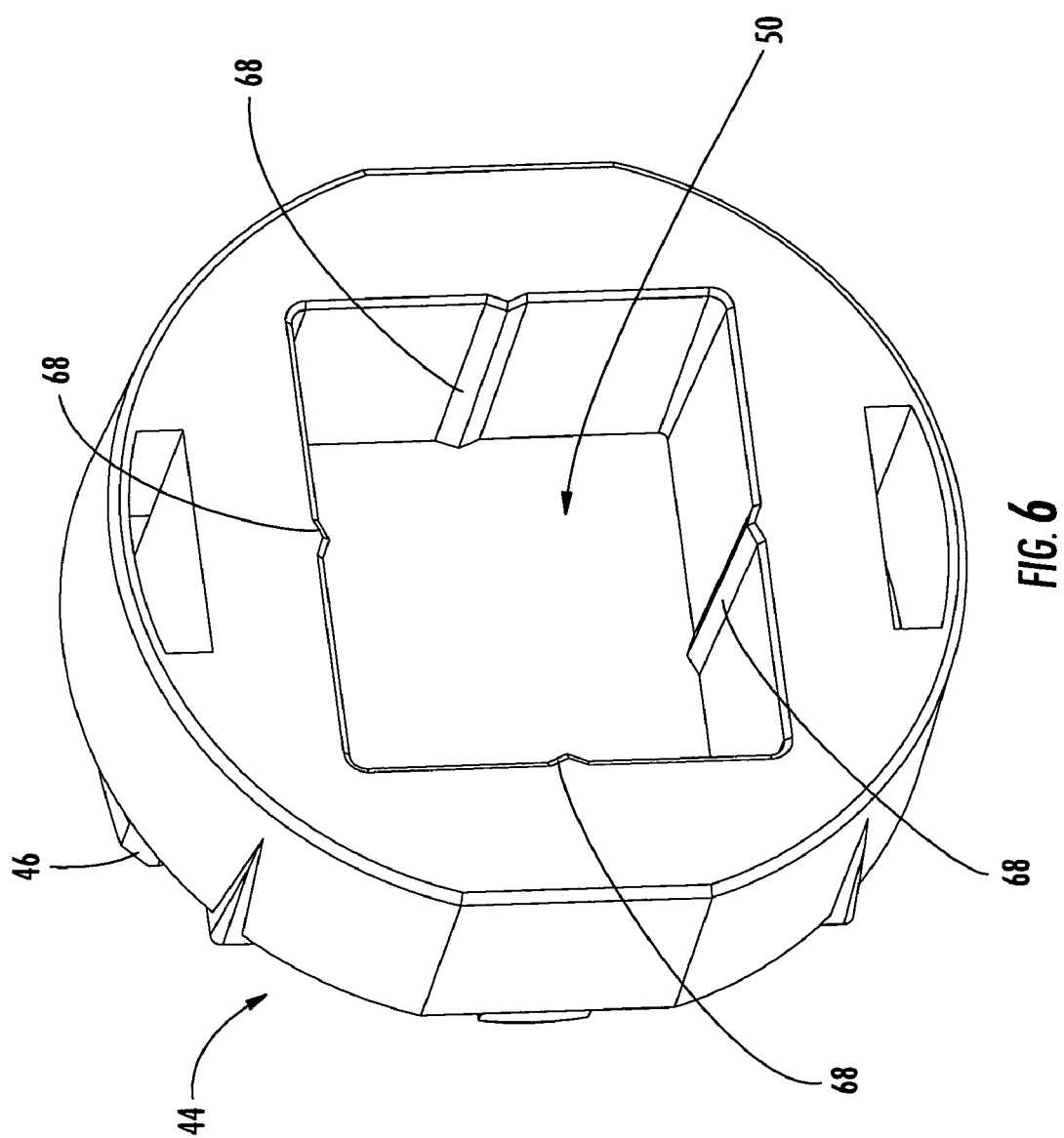
FIG. 6 is a back-side perspective view of the sleeve retainer of FIG. 5 further illustrating the alignment ribs.

Referring now to FIGS. 5 and 6, a front-side perspective view of the sleeve retainer 44 of the fiber optic receptacle 20 of FIG. 1 is shown in FIG. 5, and a back-side perspective view of the sleeve retainer 44 of the fiber optic receptacle 20 of FIG. 1 is shown in FIG. 6. The opening 50 through the sleeve retainer 44 is sized to accommodate the second end 34 of the alignment sleeve 30 such that an optical connector and/or ferrule can be inserted through the opening 50 into the alignment sleeve 30. The sleeve retainer 44 may be sized and shaped in any suitable manner. In the embodiments shown herein, the sleeve retainer 44 includes a cylindrical portion substantially similar in diameter to the internal end 28 of the receptacle housing 22, thus it appears that the sleeve retainer 44 extends the length of the receptacle 20. As is shown in FIG. 6, the back-side of the sleeve retainer 44 defines a generally flat surface.

The sleeve retainer 44 is secured to the receptacle housing 22 at the internal end 28 of the housing 22. The sleeve retainer 44 may be secured to the housing 22 in various ways, but, in the embodiments shown, the sleeve retainer 44 defines a pair of retaining clips 46 that are received by slots 48 defined by the receptacle housing 22. As such, the sleeve retainer 44 and the receptacle housing 22 of this embodiment are securely engaged. The alignment sleeve 30 may only be removed from the internal side of the receptacle 20 in embodiments in which the receptacle is positioned within a wall of an enclosure. The sleeve retainer 44 is removed from the receptacle housing 22 in order to access the alignment sleeve 30 or to access the back-side ferrule (not shown). In an alternative embodiment, the sleeve retainer 44 may be threadably attached to and removed from the receptacle housing 22.

In the embodiment shown, the sleeve retainer 44 includes a pair of tapered posts 62 that serve as supports for the springs 56 such that each spring 56 is mounted upon a respective post 62. The posts 62 are seated within recesses 66 defined by the sleeve retainer 44. The recesses 66 are an additional means for retaining the springs 56 during receptacle assembly and use. As stated above, the posts 62 are tapered in order to capture the springs 56 during assembly, thus facilitating the loading of the springs 56. The sleeve retainer 44 further defines a plurality of ribs 68 formed adjacent the opening 50 of the sleeve retainer 44. Four ribs 68 are shown with each rib 68 being positioned medially on one of the four sidewalls that define the opening 50. The ribs 68 are operable for guiding the alignment sleeve 30 to properly align with the first (i.e., plug) fiber optic connector and the second (i.e., receptacle) fiber optic connector. The ribs 68 are sized to permit the alignment sleeve 30 to rotate slightly within the opening 50. In other words, the ribs 68 allow slight angular rotation without allowing axial movement of the alignment sleeve 30, thus allowing the angles on a pair of opposed angled physical contact (APC) ferrules to line up properly. The ribs 68, along with the chamfer 60 of the alignment sleeve 30, adequately provide for alignment of opposing APC ferrules.

Figure 7:
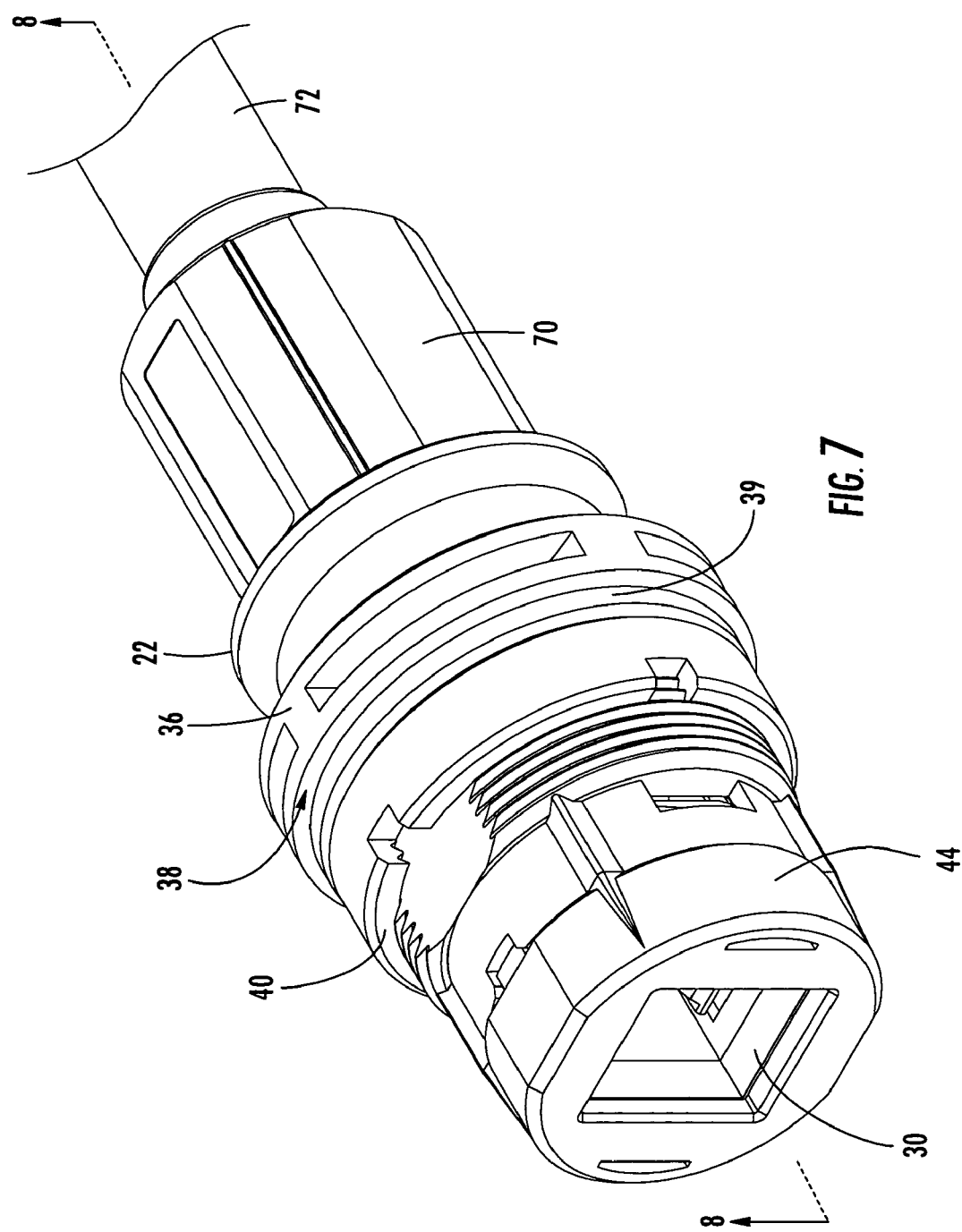
FIG. 7 is a perspective view of the fiber optic receptacle of FIG. 2 showing a fiber optic plug having a plug ferrule mated to the receptacle.

Referring to FIG. 7, a fiber optic plug 70 of a fiber optic drop cable 72 is shown engaged with an external one-piece fiber optic receptacle 20 according to the invention. At the same time, the drop cable 72 associated with the plug 70 is strain relieved at the receptacle 20. When a plug 70 has not yet engaged the receptacle 20, the receptacle is preferably covered with some form or protective dust cap (not shown) operable for preventing water and contaminants, such as dust, dirt and insects, from reaching the internal cavity 24 of the receptacle 20. When removed, the dust cap may be retained on the receptacle 20 using a tether and reused if the plug 70 is disengaged from the receptacle 20 at a later time. A dust cap may also be used to provide protection of the optical connector mounted on the drop cable 72 prior to installation until the plug 70 is engaged with the receptacle 20. Although a wall of an enclosure is not shown, a threaded coupling nut 40 is used to secure the receptacle 20 within a through opening in the wall of the enclosure. An elastomeric gasket 39 is shown disposed between the coupling nut 40 and the flat surface 38 defined by the flanged portion 36 of the receptacle housing 22. The wall of the enclosure is preferably disposed between the gasket 39 and the coupling nut 40 such that the gasket 39 is compressed against the wall as the coupling nut 40 is tightened. The gasket 39 is provided to prevent water and contaminants from penetrating through the opening in the wall of the enclosure. In alternative embodiments, a protective boot may be disposed on the internal portion of the receptacle 20 to allow the assembly to be installed in a breathable enclosure and may become obsolete if the receptacle is otherwise reliably sealed from the environment.

Figure 8:
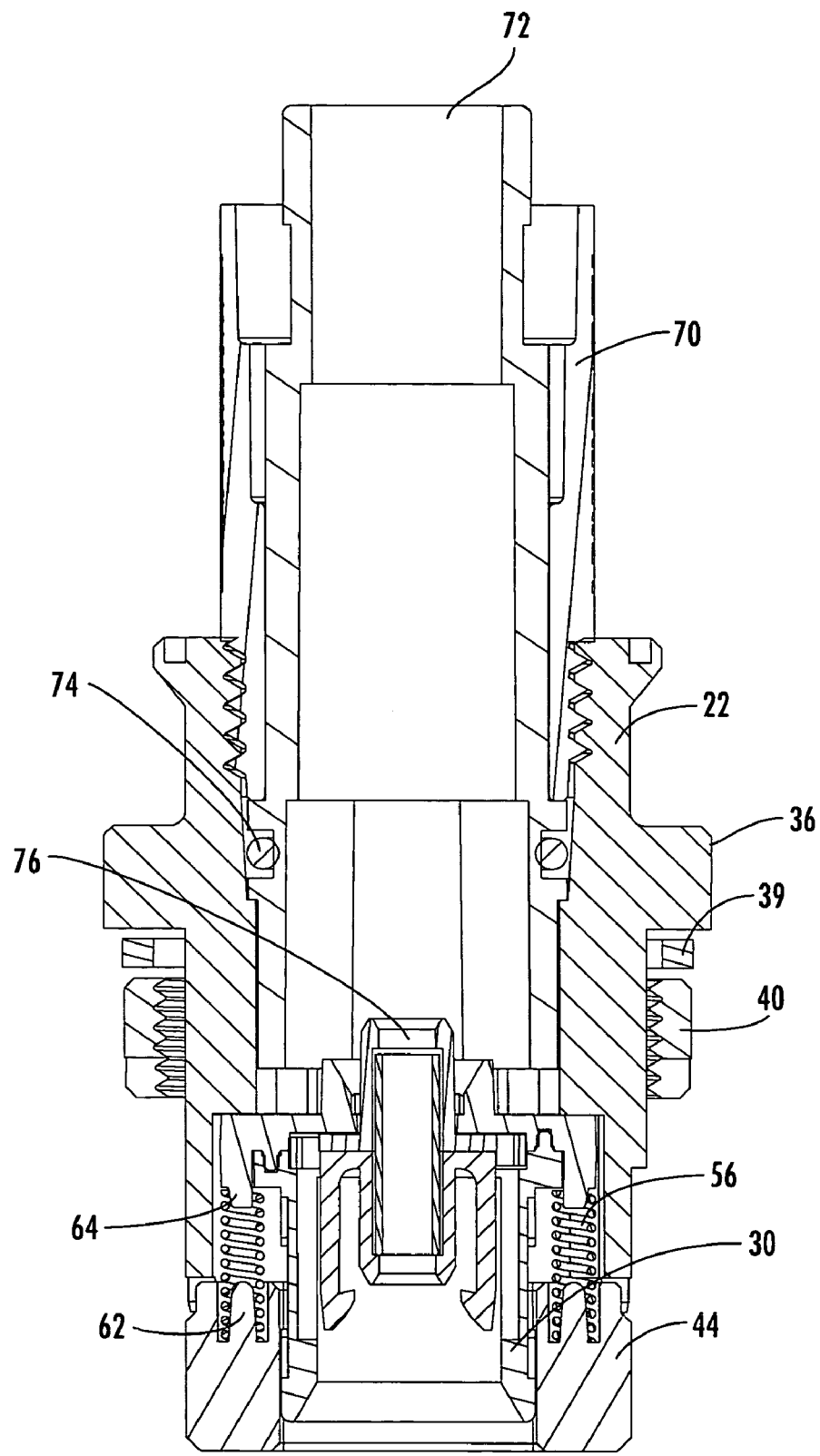
FIG. 8 is a cross-sectional view of the fiber optic receptacle of FIG. 7 taken along line 8—8.

Referring to FIG. 8, a cross-sectional view of the fiber optic receptacle 20 of FIG. 7 taken along line 8—8 is shown. An O-ring 74 may be used to provide a seal between the plug 70 and the receptacle housing 22. A plug ferrule 76 is mounted within the plug 70 such that the end face of the plug ferrule 76 extends somewhat beyond the forward end of the plug 70. As with the corresponding receptacle 20, the fiber optic plug 70 may include a variety of fiber optic connectors including SC, LC, MTRJ, MTP, SC-DC, and the like. The plug 70 of the particular embodiment is shown to include a single SC connector because a receptacle 20 can only receive a back-side ferrule of the same configuration. The plug ferrule 76 is received within the lengthwise passageway of the alignment sleeve 30 for mating the plug ferrule 76 with the back-side ferrule (not shown). Referring again to FIGS. 1 and 2, the outer periphery of the receptacle housing 22 defines an alignment mark 78 for keying alignment of the fiber optic plug 70 with the receptacle 20. The plug 70 and the corresponding receptacle 20 are configured to permit mating in only one orientation. In preferred embodiments, this orientation may also be marked on the plug 70 using alignment indicia so that a less skilled field technician can readily mate the plug 70 with the receptacle 20. Any suitable indicia may be used. After alignment, the field technician engages the external threads on the plug 70 with the internal threads on the receptacle 20 to secure the plug 70 to the receptacle 20. In an alternative embodiment, the plug 70 may define internal threads and the receptacle housing 22 may define external threads. Furthermore, any type of cooperating engagement means, such as bayonet, snap-fit or press fit may be utilized.

The receptacle housing 22 of the one-piece fiber optic receptacle 20 is mounted to a wall of an enclosure, holds the alignment sleeve 30 and aligns the plug ferrule with the back-side ferrule so that they engage in only one preferred orientation. This feature is especially advantageous for optical connections utilizing APC type ferrules where minimal angular offset is required, as well as multi-fiber ferrules that oftentimes are not centric. Additionally, the optical connection may be easily connected or disconnected by merely mating or un-mating the fiber optic plug 70 with the receptacle 20, as previously described.

The foregoing is a description of various embodiments of the invention that are given here by way of example only. Although the one-piece fiber optic receptacle has been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. A fiber optic receptacle comprising:
   a receptacle housing defining an internal cavity opening through an internal end and an opposed external end, the external end adapted to receive a fiber optic plug;
   an alignment sleeve disposed within the internal cavity defined by the receptacle housing and received through the internal end, the alignment sleeve defining a lengthwise extending passageway opening through a first end for receiving and aligning a plug ferrule and an opposed second end for receiving and aligning a back-side ferrule, the alignment sleeve defining a chamfer on the second end that guides the back-side ferrule into the alignment sleeve; and
   a sleeve retainer for retaining the alignment sleeve within the internal cavity defined by the receptacle housing, the sleeve retainer having an opening and a plurality of ribs disposed about the opening that permit angular rotation of the alignment sleeve relative to the sleeve retainer to align the plug ferrule with the back-side ferrule.

2. The fiber optic receptacle of claim 1, further comprising at least one biasing member disposed within the receptacle housing and operatively engaging at least one of the sleeve retainer and the alignment sleeve so as to urge the alignment sleeve in the direction of the external end of the receptacle housing.

3. The fiber optic receptacle of claim 2, wherein the at least one biasing member comprises a linear spring.

4. The fiber optic receptacle of claim 2, further comprising at least one biasing member support provided on at least one of the sleeve retainer and the alignment sleeve for operatively supporting the at least one biasing member within the receptacle housing.

5. The fiber optic receptacle of claim 4, wherein the at least one biasing member support comprises at least one tapered post that retains and guides a corresponding biasing member during assembly of the fiber optic receptacle.

6. The fiber optic receptacle of claim 1, wherein the sleeve retainer is removable and wherein the alignment sleeve is inserted into and removed from the internal cavity through the internal end of the receptacle housing when the sleeve retainer is removed from the receptacle housing.

7. The fiber optic receptacle of claim 1, wherein the ribs of the sleeve retainer permit angular rotation of the alignment sleeve while preventing axial movement of the alignment sleeve.

8. The fiber optic receptacle of claim 1, wherein the fiber optic receptacle is secured within an opening in a wall of an enclosure and wherein the wall of the enclosure is secured between an outwardly extending flange defined by the receptacle housing and a coupling nut secured to the receptacle housing.

9. The fiber optic receptacle of claim 8, further comprising sealing means disposed between the flange and an exterior surface of the wall of the enclosure for preventing water ingress and dirt, dust and insect intrusion into the enclosure.

10. A fiber optic receptacle for aligning an angled physical contact (APC) type plug ferrule with an opposed angled physical contact (APC) back-side ferrule, the receptacle comprising:
    a receptacle housing defining an internal cavity opening through an internal end and an opposed external end;
    an alignment sleeve disposed within the internal cavity and defining a lengthwise extending passageway opening through a first end and an opposed second end; and
    a removable sleeve retainer for retaining the alignment sleeve within the internal cavity defined by the receptacle housing, the sleeve retainer defining an opening and a plurality of alignment ribs disposed about the opening that permit angular rotation of the alignment sleeve relative to the sleeve retainer during insertion of the plug ferrule into the alignment sleeve through the external end and insertion of the back-side ferrule into the alignment sleeve through the internal end.

11. The fiber optic connector of claim 10, further comprising:
    at least one biasing member disposed within the receptacle housing and operatively engaging at least one of the sleeve retainer and the alignment sleeve so as to urge the alignment sleeve in the direction of the external end of the receptacle housing; and
    at least one biasing member support disposed on at least one of the sleeve retainer and the alignment sleeve and cooperating with a corresponding biasing member.

12. The fiber optic receptacle of claim 11, wherein the biasing member comprises at least one linear spring.

13. The fiber optic receptacle of claim 11, wherein the biasing member support comprises a tapered post that retains and guides the biasing member during assembly of the fiber optic receptacle.

14. The fiber optic receptacle of claim 10, wherein the alignment sleeve is inserted into and removed from the internal cavity through the internal of the receptacle housing with the sleeve retainer removed.

15. The fiber optic receptacle of claim 10, wherein the sleeve retainer comprises latching means for securing the sleeve retainer to the internal end of the receptacle housing.

16. The fiber optic receptacle of claim 15, wherein the latching means comprise one or more retaining clips that are received within corresponding slots formed in the receptacle housing adjacent the internal end.

17. The fiber optic receptacle of claim 10, wherein the fiber optic receptacle is disposed within an opening in a wall of an enclosure and wherein the wall of the enclosure engages an outwardly extending flange defined by the receptacle housing.

18. The fiber optic receptacle of claim 17, further comprising a seal disposed between the flange and an exterior surface of the wall operable for preventing water ingress and dirt, dust and insect intrusion into the enclosure.

19. A fiber optic receptacle assembly comprising:

a receptacle housing defining an internal cavity opening through an internal end and an opposed external end;

an alignment sleeve disposed within the internal cavity define by the receptacle housing, the alignment sleeve having a lengthwise extending passageway opening through a first end and an opposed second end adjacent the internal end of the receptacle housing, the second end of the alignment sleeve defining a chamfer for guiding a back-side ferrule into the alignment sleeve;

a removable sleeve retainer for retaining the alignment sleeve in the internal cavity defined by the receptacle housing, the sleeve retainer having an opening sized to receive the back-side ferrule inserted into the second end of the alignment sleeve through the opening and the internal end of the receptacle housing, the sleeve retainer comprising alignment means for permitting angular rotation of the alignment sleeve during insertion of a plug ferrule into the first end of the alignment sleeve and during insertion of the back-side ferrule into the alignment sleeve.

20. The fiber optic receptacle assembly of claim 19, further comprising at least one biasing member operatively engaging at least one of the sleeve retainer and the alignment sleeve so as to urge the alignment sleeve in the direction of the plug ferrule and the external end of the receptacle housing.

* * * * *